United States Patent
Ihara

(10) Patent No.: US 8,358,804 B2
(45) Date of Patent: Jan. 22, 2013

(54) IMAGE PROCESSING APPARATUS, IMAGE PROCESSING SYSTEM AND COMPUTER READABLE MEDIUM STORING PROGRAM

(75) Inventor: Fujio Ihara, Ashigarakami-gun (JP)

(73) Assignee: Fuji Xerox Co., Ltd., Tokyo (JP)

( * ) Notice: Subject to any disclaimer, the term of this patent is extended or adjusted under 35 U.S.C. 154(b) by 943 days.

(21) Appl. No.: 12/389,080

(22) Filed: Feb. 19, 2009

(65) Prior Publication Data

US 2010/0061635 A1   Mar. 11, 2010

(30) Foreign Application Priority Data

Sep. 10, 2008   (JP) ................................ 2008-231643

(51) Int. Cl.
*G06K 9/00* (2006.01)
*H04N 1/40* (2006.01)
(52) U.S. Cl. ...................................... 382/100; 358/3.28
(58) Field of Classification Search .................. 382/100; 358/3.28
See application file for complete search history.

(56) References Cited

U.S. PATENT DOCUMENTS

| 6,580,804 B1 * | 6/2003 | Abe ............................... 382/100 |
| 6,771,820 B1 * | 8/2004 | Oakeson ....................... 382/232 |
| 6,983,056 B1 * | 1/2006 | Amano ......................... 382/100 |
| 7,106,884 B2 * | 9/2006 | Tamaru ......................... 382/100 |
| 7,433,075 B2 * | 10/2008 | Tokunaga et al. ............... 358/1.9 |
| 2004/0247155 A1 * | 12/2004 | Eguchi ........................... 382/100 |
| 2007/0005977 A1 * | 1/2007 | Tohne et al. .................... 713/176 |
| 2007/0201099 A1 * | 8/2007 | Eguchi et al. ................. 358/3.28 |
| 2008/0144115 A1 * | 6/2008 | Ishii .............................. 358/3.28 |
| 2008/0292129 A1 * | 11/2008 | Fan et al. ....................... 382/100 |
| 2009/0021793 A1 * | 1/2009 | Lu et al. ........................ 358/3.28 |
| 2009/0129625 A1 * | 5/2009 | Zandifar et al. ............... 382/100 |

FOREIGN PATENT DOCUMENTS

| JP | B2-3592545 | 9/2004 |
| JP | A 2005-117154 | 4/2005 |

OTHER PUBLICATIONS

Japanese Office Action issued in corresponding Japanese Application No. 2008-231643, mailed Jun. 22, 2010. (with English-language translation).

* cited by examiner

*Primary Examiner* — Anand Bhatnagar
*Assistant Examiner* — Soo Park
(74) *Attorney, Agent, or Firm* — Oliff & Berridge, PLC

(57) ABSTRACT

An image processing apparatus includes: a recognition unit that recognizes a layout of a line including a character string in an image read from an original; a determination unit that determines a size of a region in which additional information is embedded so as to include at least a part of a line including a character string in the region, based on the layout recognized by the recognition unit; a dividing unit that divides the image read from the original based on the size of the region determined by the determination unit; and an embedding unit that embeds the additional information in the image divided by the dividing unit.

5 Claims, 18 Drawing Sheets

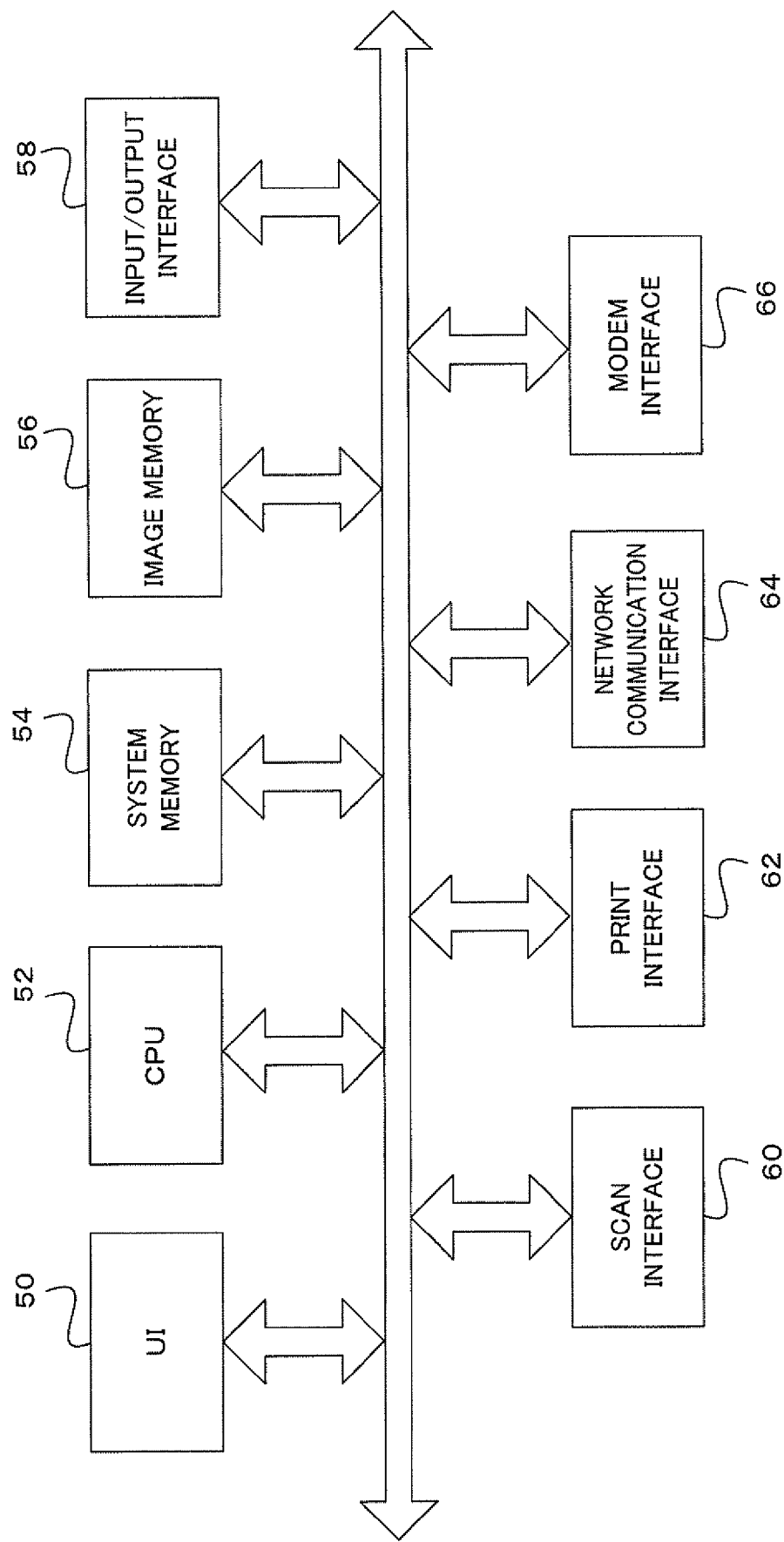

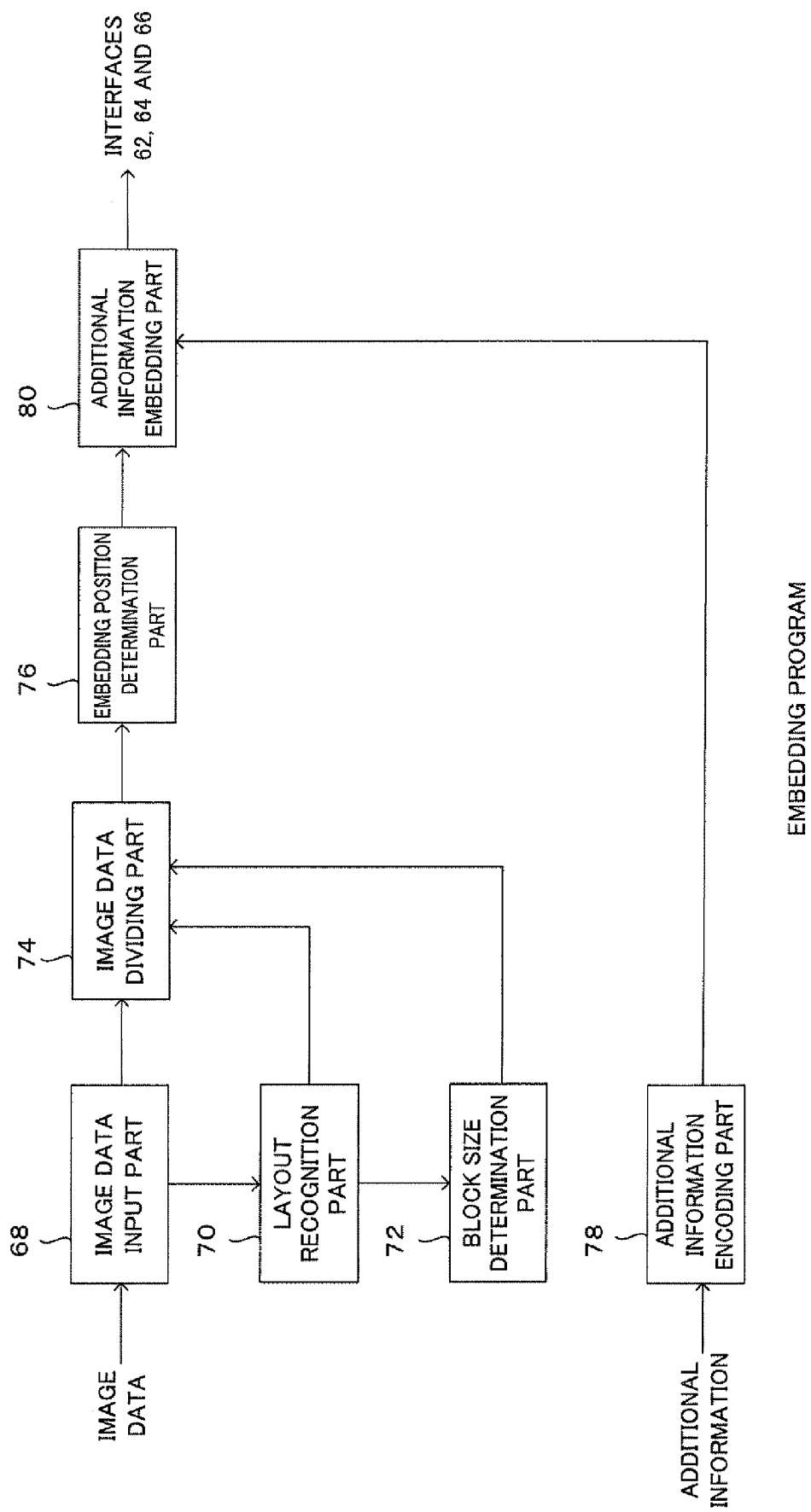

FIG. 5A

ある日の暮方の → FIRST SENTENCE

→ SPACE BETWEEN FIRST AND SECOND SENTENCES

にんが、羅生門( → SECOND SENTENCE

→ SPACE BETWEEN SECOND AND THIRD SENTENCES

みを待っていた。 → THIRD SENTENCE

FIG. 6

BLOCK DELIMITER

BLANK BLOCK CAUSED BY HYPHENATION

| ん | 具 | を | 打 | 砕 | い |
|---|---|---|---|---|---|
| 金 | 銀 | の | 箔 | （ | は | く | ） |
| こ | つ | み | 重 | ね | て | 、 |
| て | い | た | と | 云 | う | 事 |
| る | か | ら | 、 | 羅 | 生 | 門 |
| て | 顧 | る | 者 | が | な |
| こ | の | を | よ | い | 事 | に |
| 。 | 盗 | 人 | （ | ぬ | す | び |

MACRO BLOCK

EMBEDDING PROCESS (S10)

FIG. 11

BLOCK WHERE ADDITIONAL INFORMATION IS EMBEDDED

BLOCK WHERE ADDITIONAL INFORMATION IS NOT EMBEDDED

ある日の暮方の事である。一人の下人（げにん）が、羅生門（らしょうもん）の下で雨やみを待っていた。

広い門の下には、この男のほかに誰もいない。ただ、所々丹塗（にぬり）の剥（は）げた、大きな円柱（まるばしら）に、蟋蟀（きりぎりす）が一匹とまっている。羅生門が、朱雀大路（すざくおおじ）にある以上は、この男のほかにも、雨やみをする市女笠（いちめがさ）や揉烏帽子（もみえぼし）が、もう二三人はありそうなものである。それが、この男のほかには誰もいない。

何故かと云うと、この二三年、京都には、地震とか辻風（つじかぜ）とか火事とか饑饉とか云う災（わざわい）がつづいて起った。そこで洛中（らくちゅう）のさびれ方は一通りではない。旧記によると、仏像や仏具を打砕いて、その丹（に）がついたり、金銀の箔（はく）がついたりした木を、路ばたにつみ重ねて、薪（たきぎ）の料（しろ）に売っていたと云う事である。洛中がその始末であるから、羅生門の修理などは、元より誰も捨てて顧る者がなかった。するとその荒れ果てたのをよい事にして、狐狸（こり）が棲（す）む。盗人（ぬすび

DETECTION PROCESS (S20)

US 8,358,804 B2

IMAGE PROCESSING APPARATUS, IMAGE PROCESSING SYSTEM AND COMPUTER READABLE MEDIUM STORING PROGRAM

CROSS-REFERENCE TO RELATED APPLICATION

This application is based on and claims priority under 35 USC 119 from Japanese Patent Application No. 2008-231643 filed Sep. 10, 2008

BACKGROUND

Technical Field

The present invention relates to an image processing apparatus, an image processing system and a computer readable medium storing a program.

SUMMARY

According to an aspect of the invention, there is provided an image processing apparatus including: a recognition unit that recognizes a layout of a line including a character string in an image read from an original; a determination unit that determines a size of a region in which additional information is embedded so as to include at least a part of a line including a character string in the region, based on the layout recognized by the recognition unit; a dividing unit that divides the image read from the original based on the size of the region determined by the determination unit; and an embedding unit that embeds the additional information in the image divided by the dividing unit.

BRIEF DESCRIPTION OF THE DRAWINGS

An exemplary embodiment of the present invention will be described in detail based on the following figures, wherein:

FIG. 3 is a block diagram showing a control circuitry in the image forming apparatus according to the exemplary embodiment of the present invention;

FIG. 4 is a block diagram showing the configuration of an embedding program operating on the image forming apparatus according to the exemplary embodiment of the present invention;

FIGS. 5A to 5C are explanatory views showing a process to determine a block size;

FIG. 6 is an explanatory view showing a process to recognize block delimiters in image data;

FIG. 7 is an explanatory view showing a process to divide the image data in block unit;

FIGS. 8A to 8D are explanatory views showing a process to determine embedding positions in which additional information is to be embedded on the image data;

FIG. 11 is an explanatory view showing the image data in which additional information is embedded;

DETAILED DESCRIPTION

Background

First, to assist understanding of the present invention, its background will be described.

Figure 1:
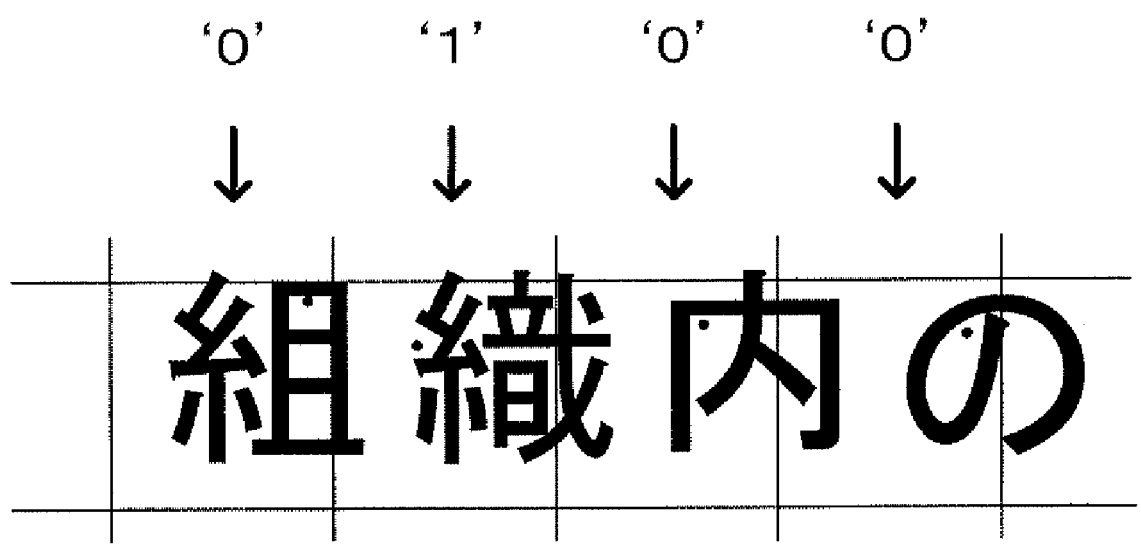
FIG. 1 is an explanatory view showing a process to embed additional information in image data.

Generally, illegal duplication of image data can be prohibited by embedding additional information in the image data. For example, as shown in FIG. 1, when additional information "1" is embedded, a dot is placed on the upper side in the vicinity of a black region, and when additional information "0" is embedded, a dot is placed on the lower side in the vicinity of a black region. To detect the additional information from the image data where the additional information is embedded in this manner, it is recognized whether each dot is on the upper side or lower side in the vicinity of a black region.

In the exemplary embodiment of the present invention described below, an image forming apparatus embeds additional information by placing a dot by block and detects the additional information by recognizing a dot position by block, as described above.

Next, the exemplary embodiment of the present invention will be described in detail with reference to the drawings. Note that the following description is merely an example upon implementation of the present invention. The present invention is not limited to the following example, and appropriate changes can be made in accordance with necessity.

[Exemplary Embodiment of the Present Invention]

Figure 2:
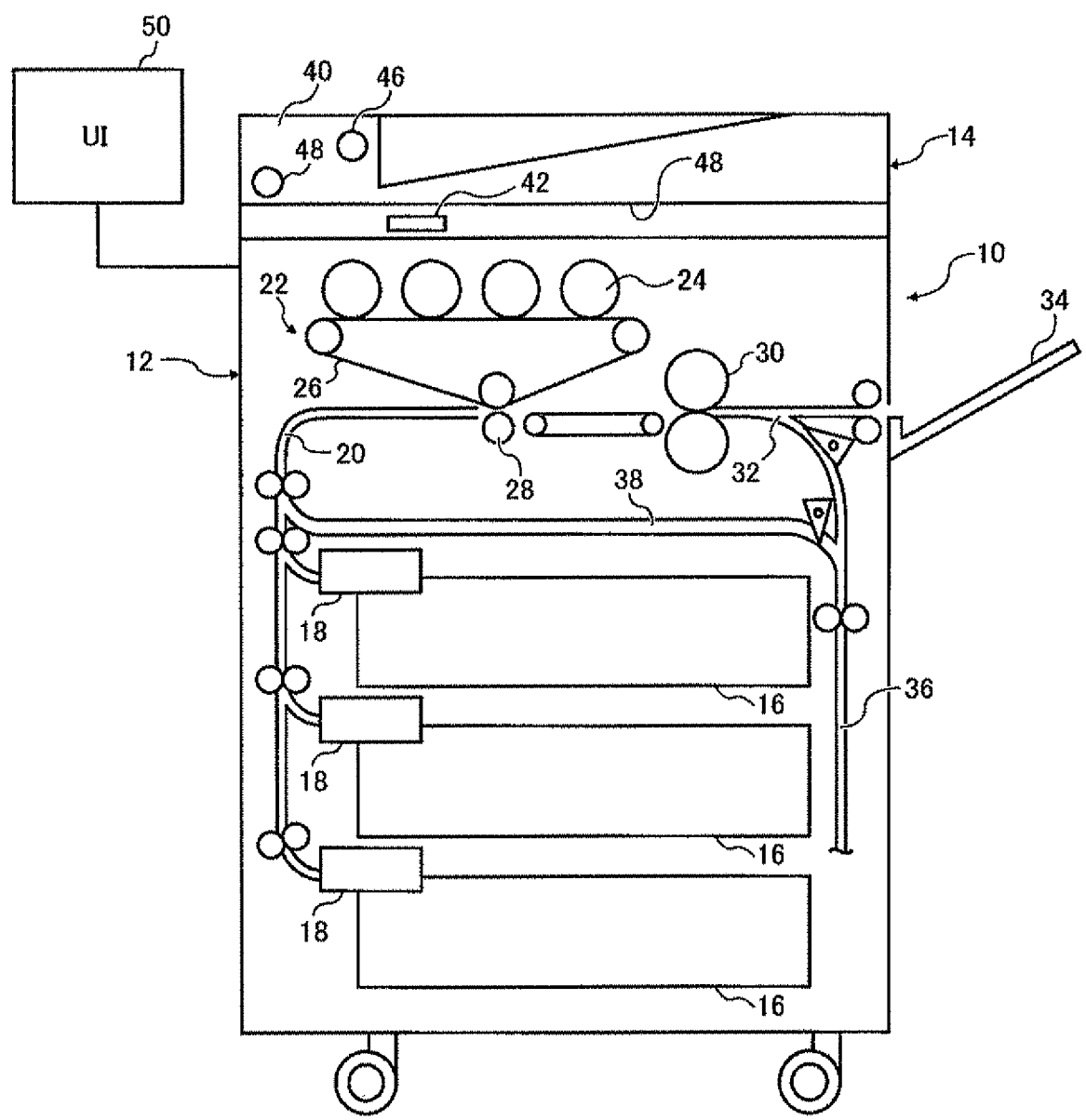
FIG. 2 is a cross-sectional view showing an image forming apparatus according to an exemplary embodiment of the present invention.

In FIG. 2, the image forming apparatus 10 has a print unit 12 and a scan unit 14. The print unit 12 has e.g. three-stage recording medium supply trays 16. The three-stage trays 16 are respectively provided with a supply head 18. When one of the recording medium supply trays 16 is selected, the supply head 18 is actuated and a recording medium is supplied from the selected recording medium supply tray 16 via a recording medium supply passage 20 to a print engine 22.

The print engine 22, which is an e.g. color-and-monochromatic xerography print engine, is provided with yellow, magenta, cyan and black photoreceptors 24, and provided with an intermediate transfer belt 26. A charging device, an illumination device, a developing device, a first transfer device, a cleaning device (none shown) and the like are arranged around each photoreceptor 24. Toner images formed with the respective photoreceptors 24 are transferred onto the intermediate transfer belt 26. In the case of monochrome printing, only the black photoreceptor 24 is operative. The toner image on the intermediate transfer belt 26 is transferred onto a supplied recording medium with a second transfer roller, and fixed to the recording medium by a fixing device 30. Then recording medium on which the toner image has been fixed is output through a recording medium output passage 32 to a output tray 34.

Note that when double-sided printing is set, the recording medium, where the toner image has been fixed to its surface by the fixing device 30, is sent from the recording medium output passage 32 to a reversing device 36. Then the recording medium is reversed by the reversing device 36, sent to a recording medium reverse passage 38, again returned to the recording medium supply passage 20, sent to the print engine 22, and printing is performed on the reverse side.

The scan unit 14 has an automatic document feeder 40 such as a DADF capable of reading a double-sided original. An original is fed by the automatic document feeder 40 to a platen 42, and an original image is read by a reading part 44 having a CCD and the like on the platen 42. Further, the scan unit 14 is provided with an original set status detector 46 to detect whether or not the original has been set on the automatic document feeder 40. Further, as the automatic document feeder 40 also functions as a platen cover, the platen cover is opened and the original can be placed on the platen 42. The opening/closing of the platen cover can be detected by a platen cover open/close detector 48. Further, the image forming apparatus 10 is provided with a modem connected to a public line for facsimile communication and a network communication device connected to a network such as a LAN.

A user interface device 50 (hereinbelow referred to as a "UI device 50"), provided integrally with the image forming apparatus 10 or via a network, selects a process in the image forming apparatus 10 and displays the selected process.

FIG. 3 shows a control circuitry in the image forming apparatus 10. In addition to the above-described UI device 50, a CPU 52, a system memory 54, an image memory 56, an input/output interface 58, a scan interface 60, a print interface 62, a network communication interface 64 and a modem interface 66 for facsimile communication are interconnected via a bus. The CPU 52 controls the respective circuits in accordance with a program written on the system memory 54 (or written on an external storage medium (not shown) such as a CD-ROM). Operation input data from the UT device 50 is transmitted to the CPU 52, and display image data from the CPU 52 is transmitted to the UT device 50. The image memory 56 temporarily holds an image read in the image processing apparatus 10. The input/output interface 58 inputs an original set detection signal from the above-described original set status detector 46 and a platen cover open/close signal from the platen cover open/close detector 48 to detect open/close status of the platen cover.

[Embedding Process]

FIG. 4 shows the configuration of an embedding program operating on the image forming apparatus 10. As shown in FIG. 4, the embedding program has an image data input part 68, a layout recognition part 70, a block size determination part 72, an image data dividing part 74, an embedding position determination part 76, an additional information encoding part 78, and an additional information embedding part 80. The embedding program having this configuration embeds additional information in image data.

When a user scans image data and additional information and operates the above-described UT device 50 so as to embed the additional information in the image data, the above-described CPU 52 reads the embedding program from the system memory 54 (or the external storage medium) and executes the program. Note that it may be arranged such that the image data and the additional information are previously stored in the system memory 54.

The image data input part 68 receives input of the image data stored in the system memory 54 or the image memory 56, and outputs the image data to the layout recognition part 70 and the image data dividing part 74. The layout recognition part 70 performs general projection process on the image data received from the image data input part 68, thereby recognizes a layout, i.e., a format such as a text direction (vertical writing or horizontal writing), a region including a large number of characters (line), and a region including no character (line space, margin and the like). The layout recognition part 70 outputs layout information to the block size determination part 72 and the image data dividing part 74. The block size determination part 72 determines a block size based on the layout information from the layout recognition part 70, and outputs the block size to the image data dividing part 74. For example, when the text direction is horizontal writing, the block size determination part 72 determines a block height using a line height or a value obtained by adding a half value of the line space to the line height, and determines a block width using a predetermined value. The image data dividing part 74 divides the image data from the image data input part 68 based on the layout information from the layout recognition part 70 and the block size determined by the block size determination part 72, in block unit. The embedding position determination part 76 determines positions in which the additional information is embedded (hereinbelow, "embedding positions") in the image data divided in block unit by the image data dividing part 74, and outputs the divided image data to the additional information embedding part 80. The additional information encoding part 78 adds information for detection and correction of error to the additional information stored on the system memory 54 or the image memory 56, encodes the additional information (performs error correction encoding), and outputs the additional information to the additional information embedding part 80. The information for detection and correction of error is an error correction bit based on BCH (56, 38, 7) code, or the like. Note that a conversion process based on the Reed-Solomon code may be performed on the additional information. The additional information embedding part 80 embeds the error-correction encoded additional information from the additional information encoding part 78 in the embedding positions determined by the embedding position determination part 76, and outputs the image data to an interface such as the print interface 62.

Figure 5B:
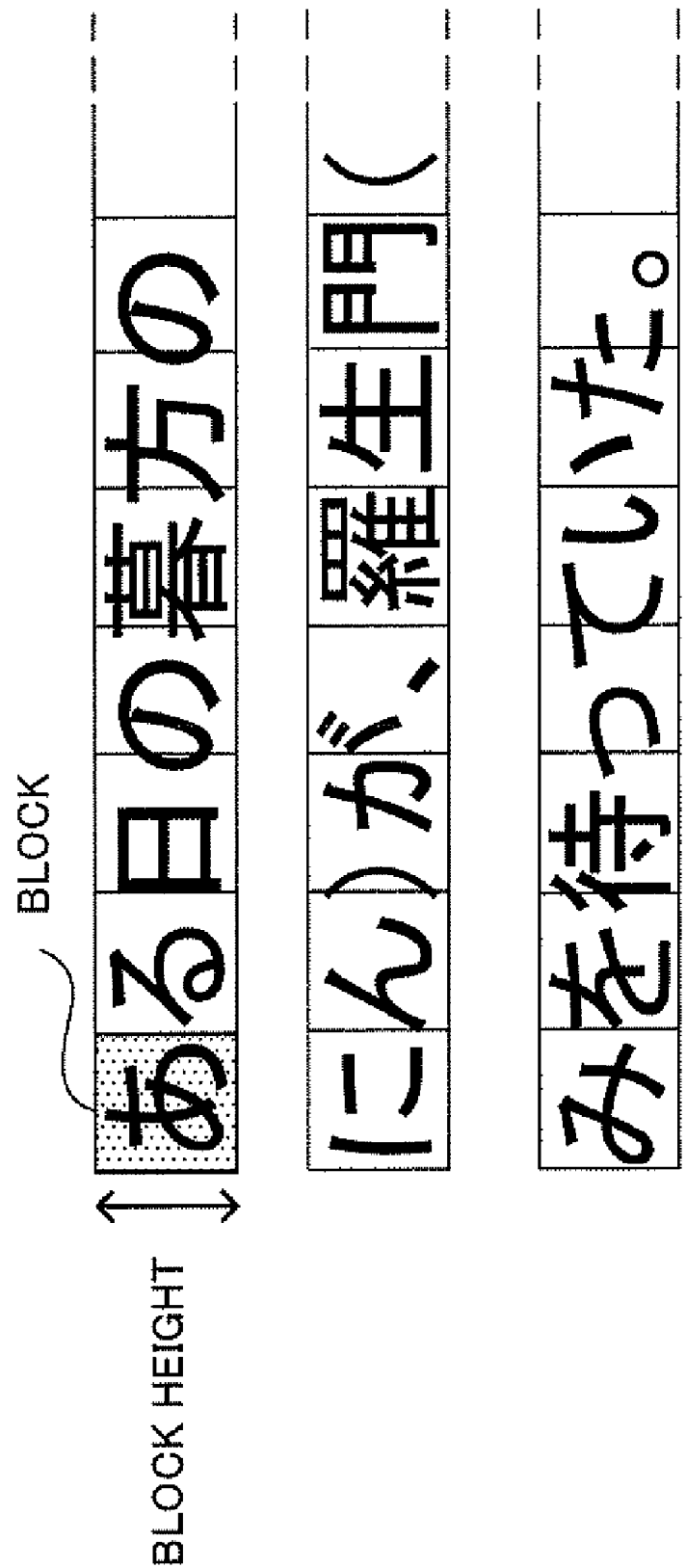
Figure 5C:
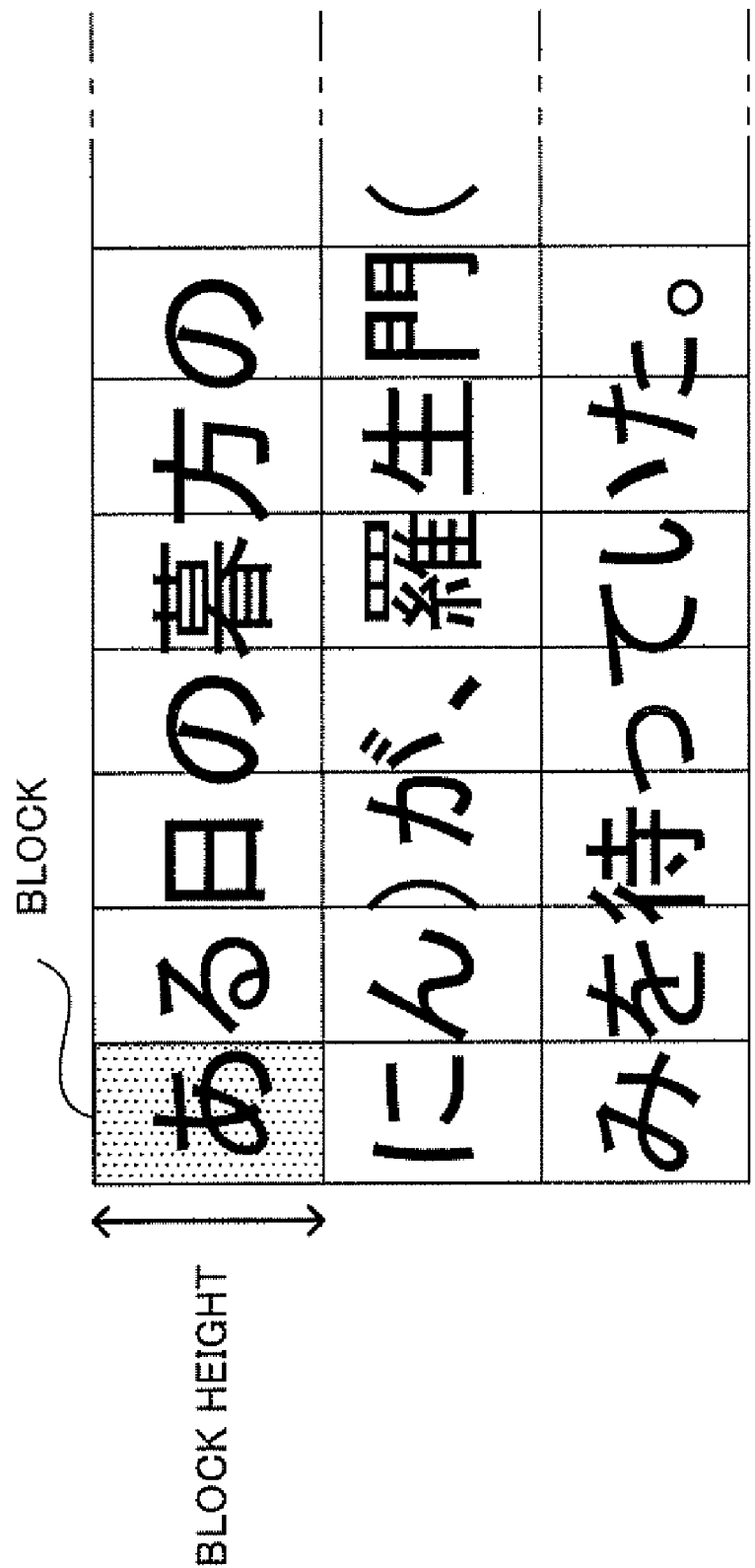

The block size is determined in e.g. a format shown in FIGS. 5A to 5C.

FIG. 5A shows an example where the above-described layout recognition part 70 recognizes a format, a line and line space. FIG. 5B shows an example where the above-described block size determination part 72 determines a block height using a line height based on the format and the line recognized in FIG. 5A and determines a block width using a predetermined value. FIG. 5C shows an example where the block size determination part 72 determines the block height using a value obtained by adding a half value of the line space to the line height based on the format, the line and the line space recognized in FIG. 5A and determines the block width using the predetermined value.

In the image data, for example, block delimiters are recognized using e.g. a format shown in FIG. 6, and divided in block unit using a format shown in FIG. 7.

FIG. 6 shows an example where the above-described image data dividing part 74 recognizes the center of the line space recognized in FIG. 5A as a block delimiter.

FIG. 7 shows an example where the above-described image data dividing part 74 divides the image data in block unit based on the block size determined in FIG. 5C and the block delimiters in FIG. 6.

The embedding positions are determined using e.g. the format shown in FIGS. 8A to 8D. FIGS. 8A to 8D show an example where the above-described embedding position determination part 76 determines the embedding positions in the image data divided in block unit in FIG. 7.

Figure 8A:
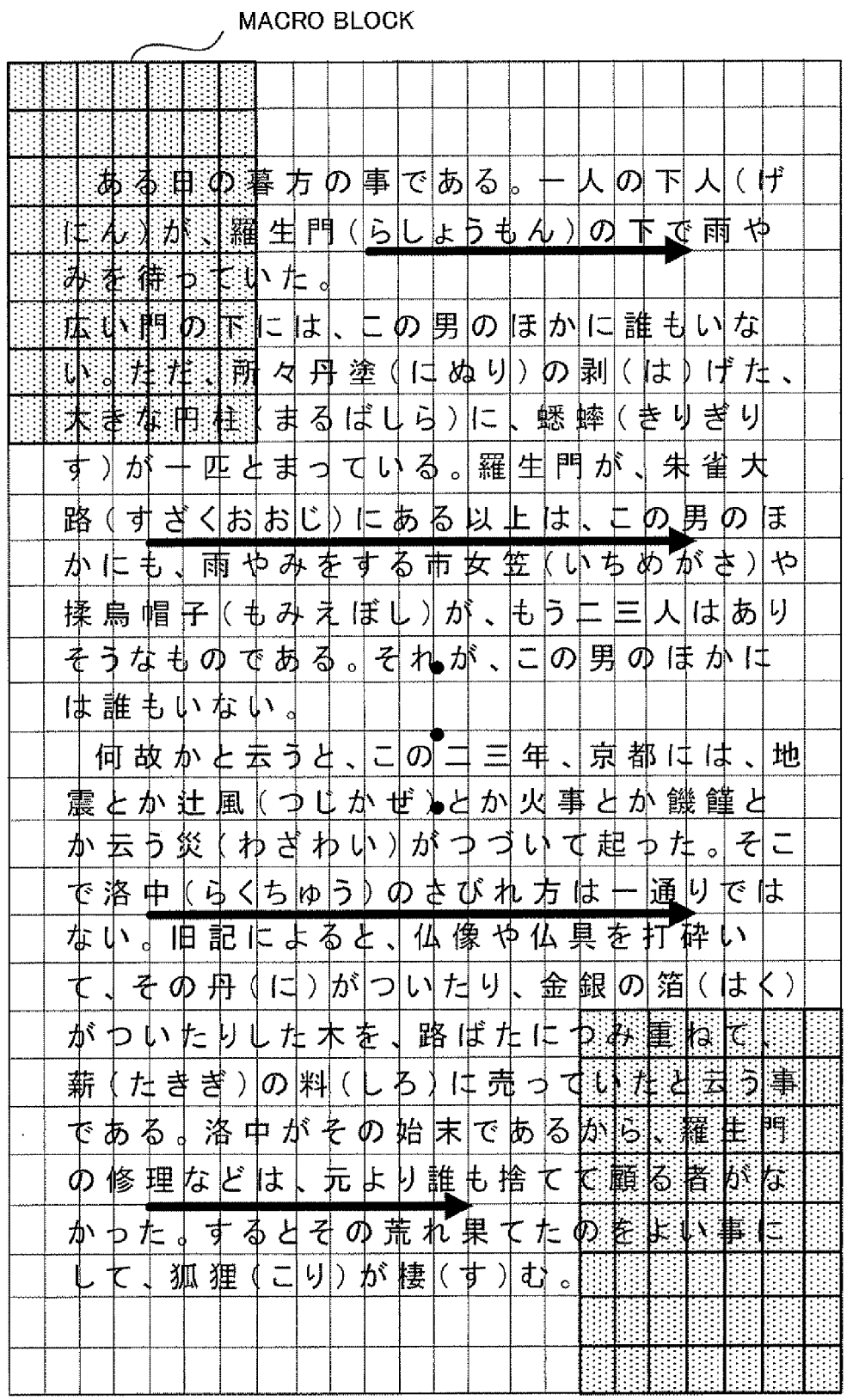

As shown in FIG. 8A, the embedding position determination part 76 scans a macro block on the image data in FIG. 7 while moving the macro block by block, and determines a position where the number of blank blocks in which the additional information cannot be embedded is equal to or less than a predetermined value, as an embedding position. In FIG. 8A, since the format of the image data is horizontal writing, the embedding position determination part 76 scans the macro block from an upper left position of the image data toward a lower right position. When the format of the image data is columnar writing, the embedding position determination part 76 scans the macro block from an upper right position of the image data toward a lower left position.

Note that the macro block has a predetermined number of the blocks determined in FIG. 5C. In this example, the macro block has vertical 8 blocks×horizontal 7 blocks, i.e., total 56 blocks, in correspondence with the error-correction coding method (BCH (56, 38, 7) code) used in the additional information encoding part 78. In the macro block, in correspondence with error-correctable three bits in the BCH (56, 38, 7) code, a position in which the number of blank blocks in the macro block is equal to or less than three is an embedding position. It may be arranged such that the macro block has e.g. a vertical 1 block×horizontal 8 blocks, i.e., total 8 blocks in correspondence with the layout recognized by the layout recognition part 70.

Figure 8C:
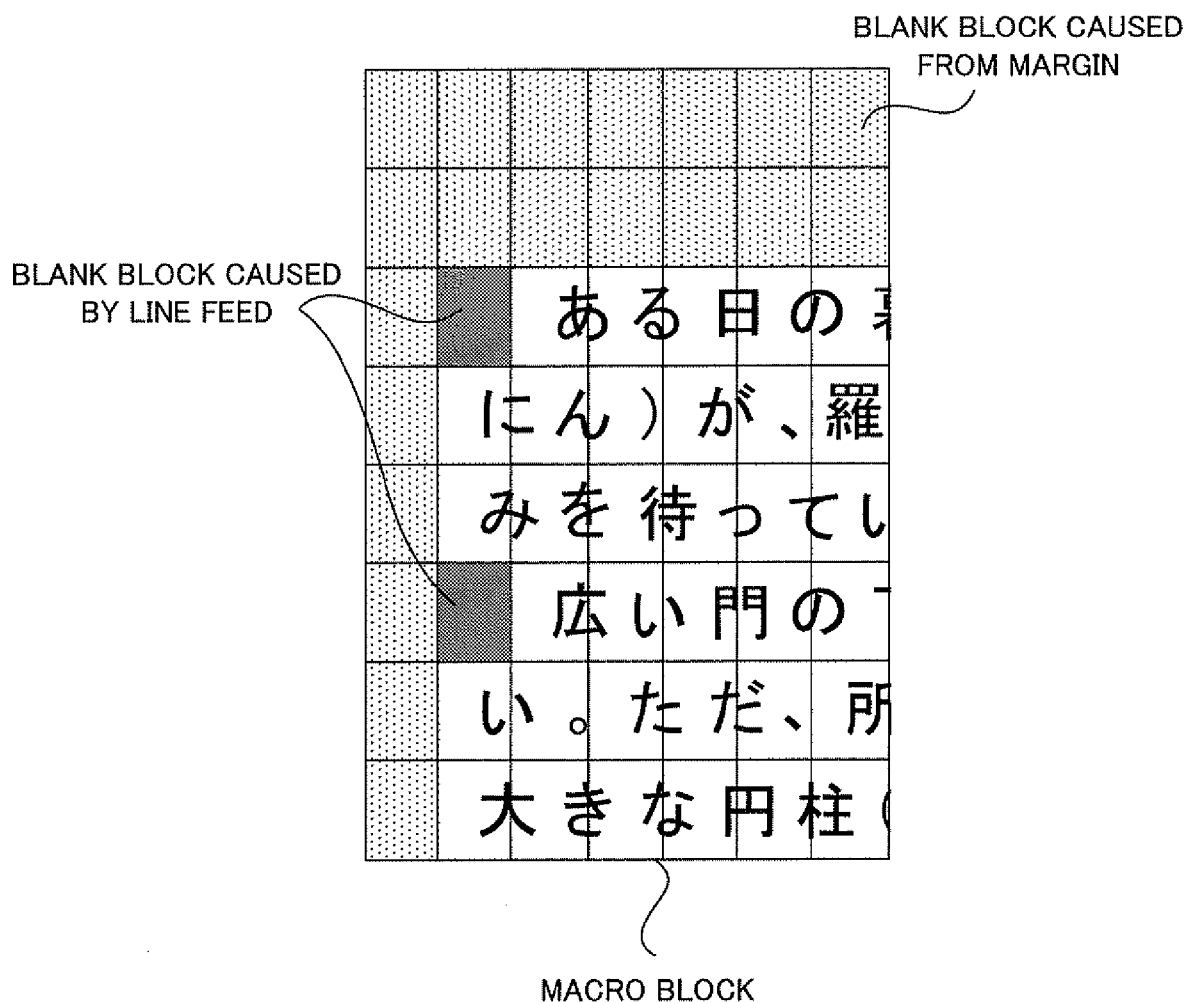

FIG. 8B shows an example of a position where the number of blank blocks in the macro block is equal to or less than three and the additional information is embedded. The blank block shown in FIG. 8B is caused by hyphenation. FIG. 8C shows an example of positions where the number of blank blocks in the macro block is more than three and the additional information is not embedded. The blank blocks shown in FIG. 8C are caused with line feed and margin of the image data.

Figure 8D:
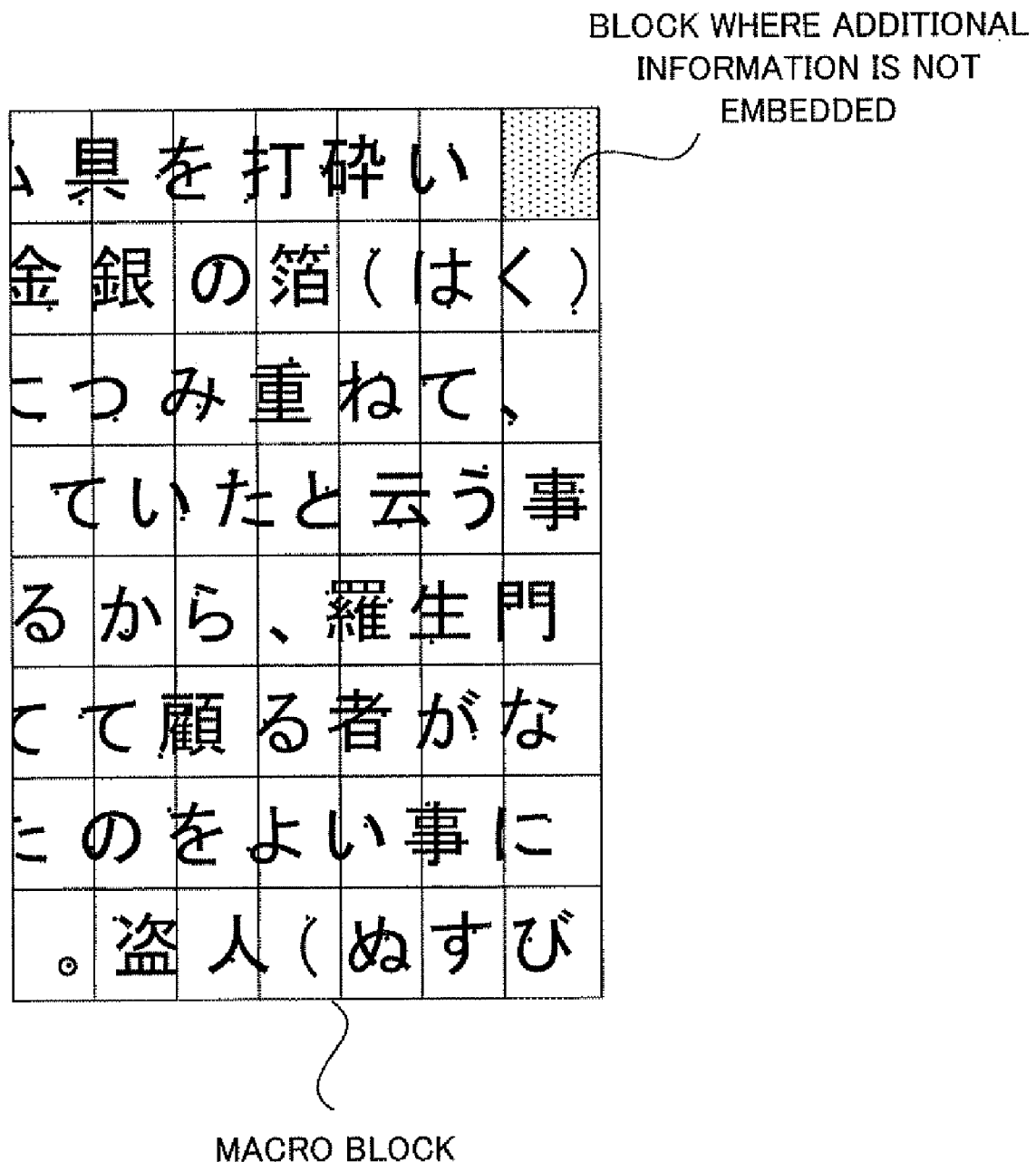

FIG. 8D shows an example where the above-described additional information embedding part 80 embeds the additional information in the position in FIG. 5B. As shown in FIG. 5D, dots are embedded as the additional information in the respective blocks except the blank block.

Figure 9:
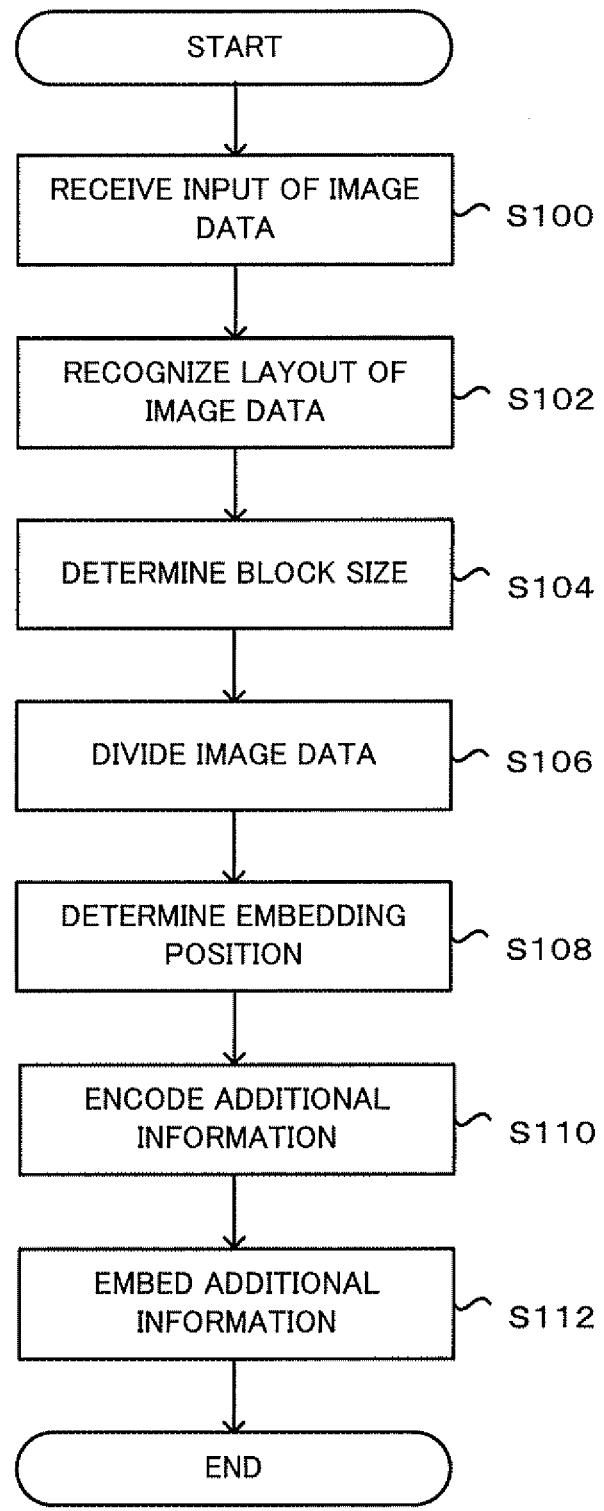
FIG. 9 is a flowchart showing the flow of an embedding process on the image forming apparatus according to the exemplary embodiment of the present invention.

FIG. 9 is a flowchart showing the operation flow of the above-described embedding program.

At step S100, the image data input part 68 receives input of image data stored on the system memory 54 or the image memory 56, and the process proceeds to step S102.

At step S102, the layout recognition part 70 recognizes the layout of the image data received from step S100, and the process proceeds to step S104.

At step S104, the block size determination part 72 determines a block size based on the layout recognized at step S102, and the process proceeds to step S106.

At step S106, the image data dividing part 74 divides the image data encoded at step S100 in block unit based on the layout recognized at step S102 and the block size determined at step S104, and the process proceeds to step S108.

At step S108, the embedding position determination part 76 determines embedding positions on the image data divided in block unit at step S106, and the process proceeds to step S110.

At step S110, the additional information encoding part 78 performs error correction encoding on the additional information stored on the system memory 54 or the image memory 56, and the process proceeds to step S112.

At step S112, the additional information embedding part 80 embeds the additional information error-correction encoded at step S110 in the embedding positions determined at step S108, and the embedding program ends.

As described above, the embedding program is executed on the image forming apparatus according to the present exemplary embodiment, thereby a block size is determined based on the layout (format, line, line space and the like) of image data in which additional information is to be embedded, and the additional information is embedded by block based on error-correctable positions.

Figure 10:
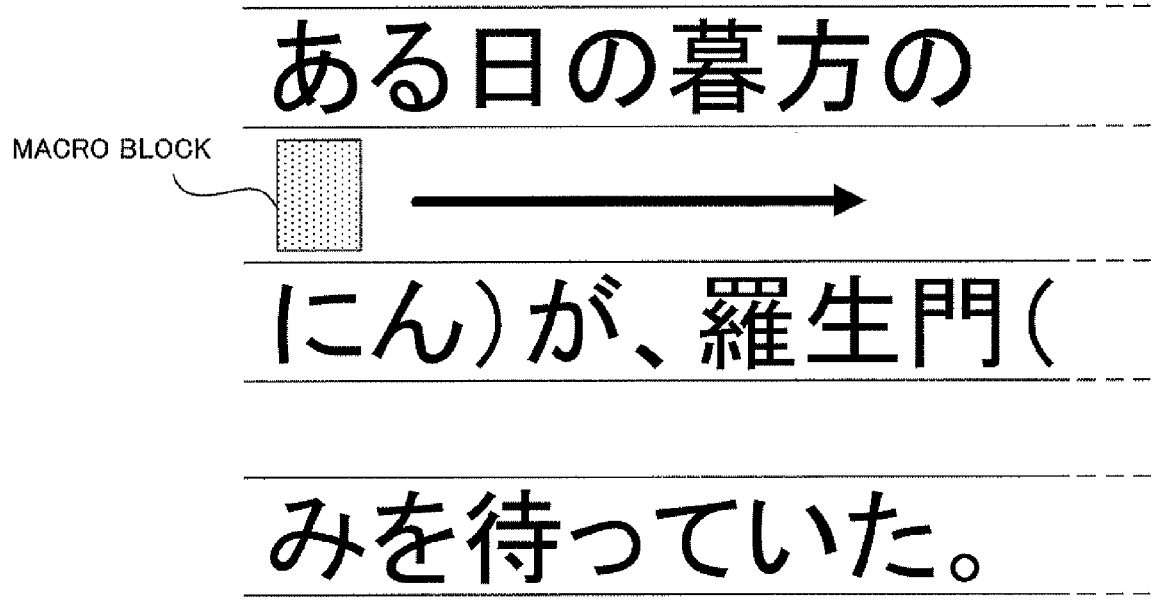
FIG. 10 is an explanatory view showing a process to scan a macro block on image data with wide line space.

As the block size is determined based on the layout of the image data, one block often includes a character or a part of a character. For example, on image data having a layout as shown in FIG. 10 where the line space is wider than a block height, in comparison with a case where a macro block having fixed sized blocks is scanned, the number of blank blocks in which the additional information is not embedded is smaller. In this manner, for example, as shown in FIG. 11, in the image data, since blocks where additional information is embedded are adjacent to each other at a high rate, a block where the additional information is embedded can be easily detected in detection of the additional information. Further, when a block where the additional information is not embedded includes noise (image roughness), the possibility of erroneous detection of the noise as the additional information can be reduced.

[Detection Process]

Figure 12:
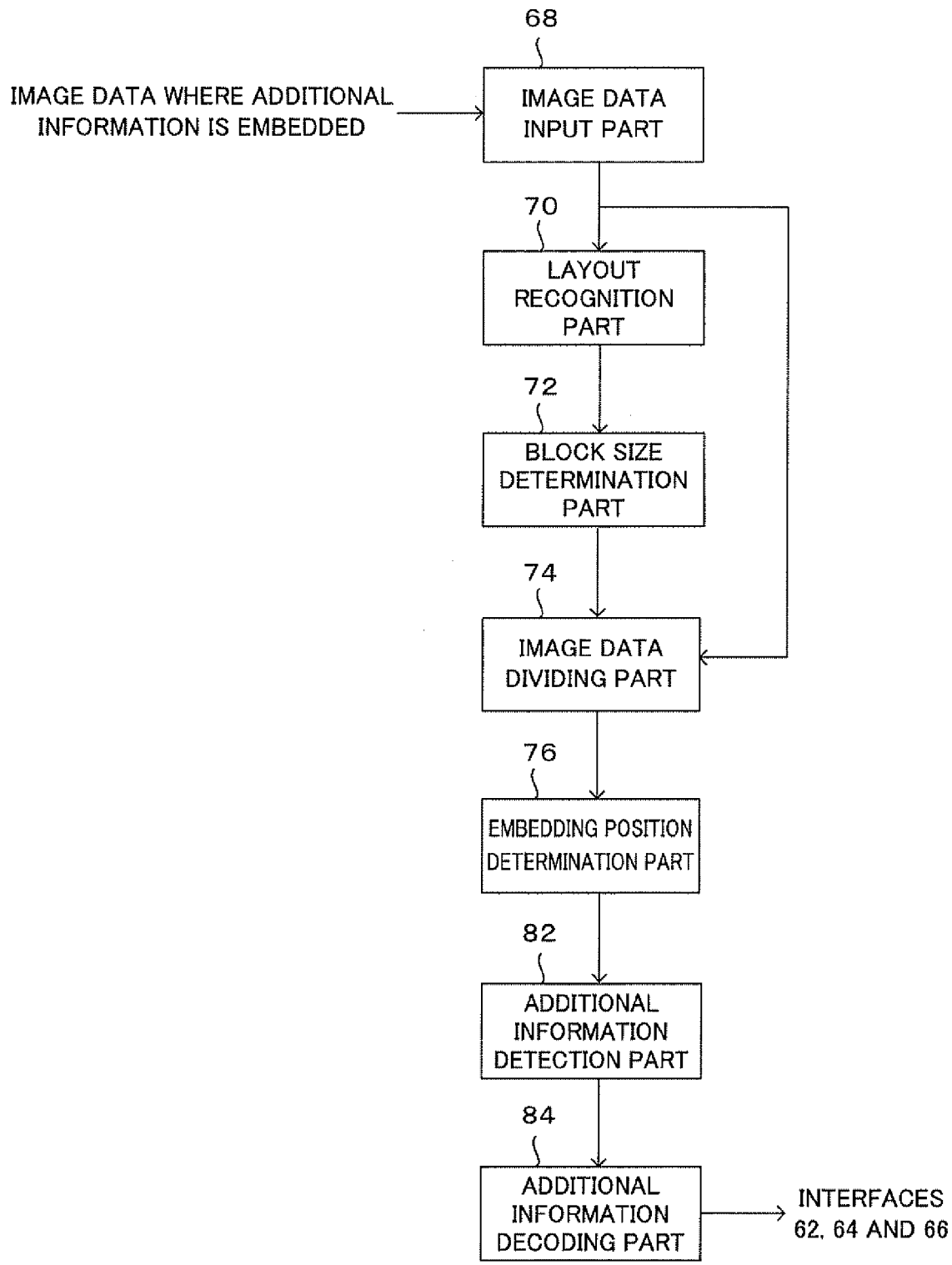
FIG. 12 is a block diagram showing the configuration of a detection program operating on the image forming apparatus according to the exemplary embodiment of the present invention.

FIG. 12 shows the configuration of a detection program operating on the image forming apparatus 10. As shown in FIG. 12, the detection program has the image data input part 68, the layout recognition part 70, the block size determination part 72, the image data dividing part 74, the embedding position determination part 76, an additional information detection part 82, and an additional information decoding part 84. The detection program having this configuration detects additional information from image data in which the additional information is embedded.

When a user scans image data in which additional information is embedded and operates the above-described UT device 50 so as to detect the additional information from the image data, the above-described CPU 52 reads the detection program from the system memory 54 (or the external storage medium) and executes the program. Note that it may be arranged such that the image data in which the additional information is embedded is previously stored in the system memory 54.

The image data dividing part 74 divides the image data received from the image data input part 68 in block unit based on a block size determined by the block size determination part 72 such that each block includes a dot.

The embedding position determination part 76 scans a macro block on the image data divided in block unit by the image data dividing part 74 while moving the macro block by block, and determines a position in which a character or a part of a character is not included and the number of blocks in which the additional information is not embedded is equal to or less than a predetermined value in the macro block, as an embedding position.

The additional information detection part 82 detects the additional information in the embedding position determined by the embedding position determination part 76 as a position in which the additional information is embedded, and outputs the additional information to the additional information decoding part 84.

The additional information decoding part 84 performs error correction decoding on the additional information detected by the additional information detection part 82 and outputs the additional information to an interface such as the print interface 62.

Figure 13:
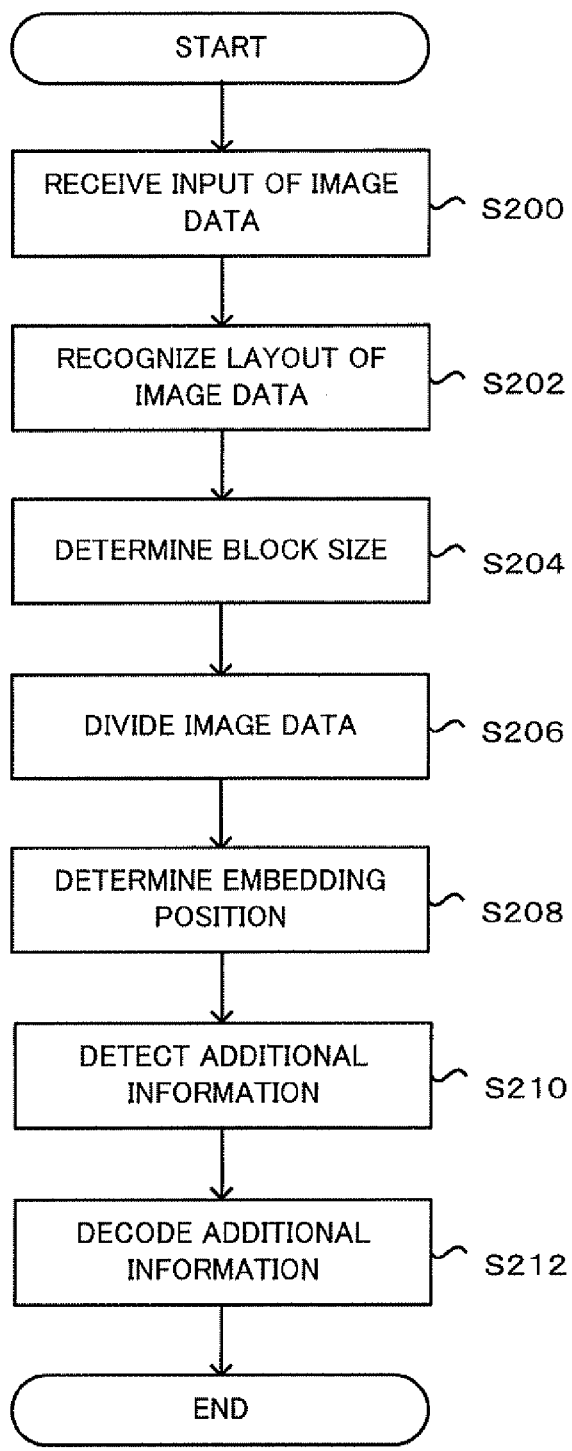
FIG. 13 is a flowchart showing the flow of a detection process on the image forming apparatus according to the exemplary embodiment of the present invention.

FIG. 13 is a flowchart showing the operation flow of the above-described detection program.

At steps S200 to S204, the same processes as that at steps S100 to S104 in the operation flow of the above-described embedding program are performed.

At step S206, the image data received from step S200 is divided in block unit such that each block includes a dot, based on the block size determined at step S204, and the process proceeds to step S208.

At step S208, a macro block is scanned on the image data divided in block unit at step S206 while the macro block is moved by block, and a position, in which the number of blocks where a character or a part of a character is not included and the additional information is not embedded is equal to or less than a predetermined value in the macro block, is determined as an embedding position.

At step S210, the additional information detection part 82 detects the additional information in the embedding position determined at step S208, and the process proceeds to step S212.

At step S212, the additional information decoding part 84 error-correction decodes the additional information detected at step S212, and the detection program ends.

In the above-described exemplary embodiment, additional information is embedded in image data including character strings, and the additional information is detected. However, the present invention is not limited to this arrangement. For example, it may be arranged such that the additional information is embedded in image data including other images which are easily binarized (e.g., ruled lines) and the additional information is detected.

Further, in the above-described exemplary embodiment, the present invention is applied to the image forming apparatus 10 provided with the system memory 54 for storage of additional information, the CPU 52 to execute the embedding program and the detection program, and the print engine 22 to output processed image data. Further, the present invention can be similarly applied to a system in which these constituent elements are provided in plural apparatuses (for example, a system including an image forming apparatus having the system memory 54 and the CPU 52 and a print server having the print engine 22). In such system, the apparatuses having the respective constituent elements are interconnected via a network for mutual communication.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The exemplary embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
a recognition unit that recognizes a layout of a line including a character string in an image read from an original;
a determination unit that determines a size of a region in which additional information is to be embedded so as to include at least a part of a line including a character string in the region, based on the layout recognized by the recognition unit;
a dividing unit that divides the image read from the original into equal regions having the size determined by the determination unit;
an embedding unit that embeds the additional information in the image divided by the dividing unit; and
an adding unit that adds information for error correction to the additional information,
wherein the embedding unit scans a group of regions, the number of which corresponds to an amount of the additional information and the information for error correction, searches for a position of the group of regions in which the number of regions not including a character or a part of a character is within an error-correctable number in the group of regions, and embeds the additional information in a region including a character or a part of a character in this position.

2. The image processing apparatus according to claim 1 further comprising an original reading unit that reads an original.

3. The image processing apparatus according to claim 1, further comprising an output unit that outputs an image in which the additional information is embedded by the embedding unit.

4. An image forming system comprising a first communication apparatus that embeds additional information in an image, and a second communication apparatus that receives information of the image in which the additional information is embedded from the first communication apparatus and detects the additional information from the information of the image,
the first communication apparatus including:
a recognition unit that recognizes a layout of a line including a character string in an image read from an original;
a determination unit that determines a size of a region in which the additional information is to be embedded so as to include at least a part of a line including a character string in the region, based on the layout recognized by the recognition unit;
a dividing unit that divides the image read from the original into equal regions having the size determined by the determination unit;
an embedding unit that embeds the additional information in the image divided by the dividing unit; and
an adding unit that adds information for error correction to the additional information,
wherein the embedding unit scans a group of regions, the number of which corresponds to an amount of the additional information and the information for error correction, searches for a position of the group of regions in which the number of regions not including a character or a part of a character is within an error-correctable number in the group of regions, and embeds the additional information in a region including a character or a part of a character in this position.

5. A computer readable medium storing a program causing a computer to execute a process for image processing, the process comprising:
recognizing a layout of a line including a character string in an image read from an original;
determining a size of a region in which additional information is to be embedded so as to include at least a part of a line including a character string in the region, based on the recognized layout;
dividing the image read from the original into equal regions having the determined size;
embedding the additional information in the divided image; and
adding information for error correction to the additional information,
wherein the embedding step proceeds by scanning a group of regions, the number of which corresponds to an amount of the additional information and the information for error correction, searching for a position of the group of regions in which the number of regions not including a character or a part of a character is within an error-correctable number in the group of regions, and embedding the additional information in a region including a character or a part of a character in this position.

* * * * *